May 29, 1934.  K. ENZ  1,960,485
METHOD AND APPARATUS FOR SEPARATING SAND FROM WATER
Filed Feb. 16, 1931  4 Sheets-Sheet 1

INVENTOR
Karl Enz
Whittemore Hulbert
By Whittemore Belknap
ATTORNEYS

May 29, 1934. K. ENZ 1,960,485
METHOD AND APPARATUS FOR SEPARATING SAND FROM WATER
Filed Feb. 16, 1931 4 Sheets-Sheet 3
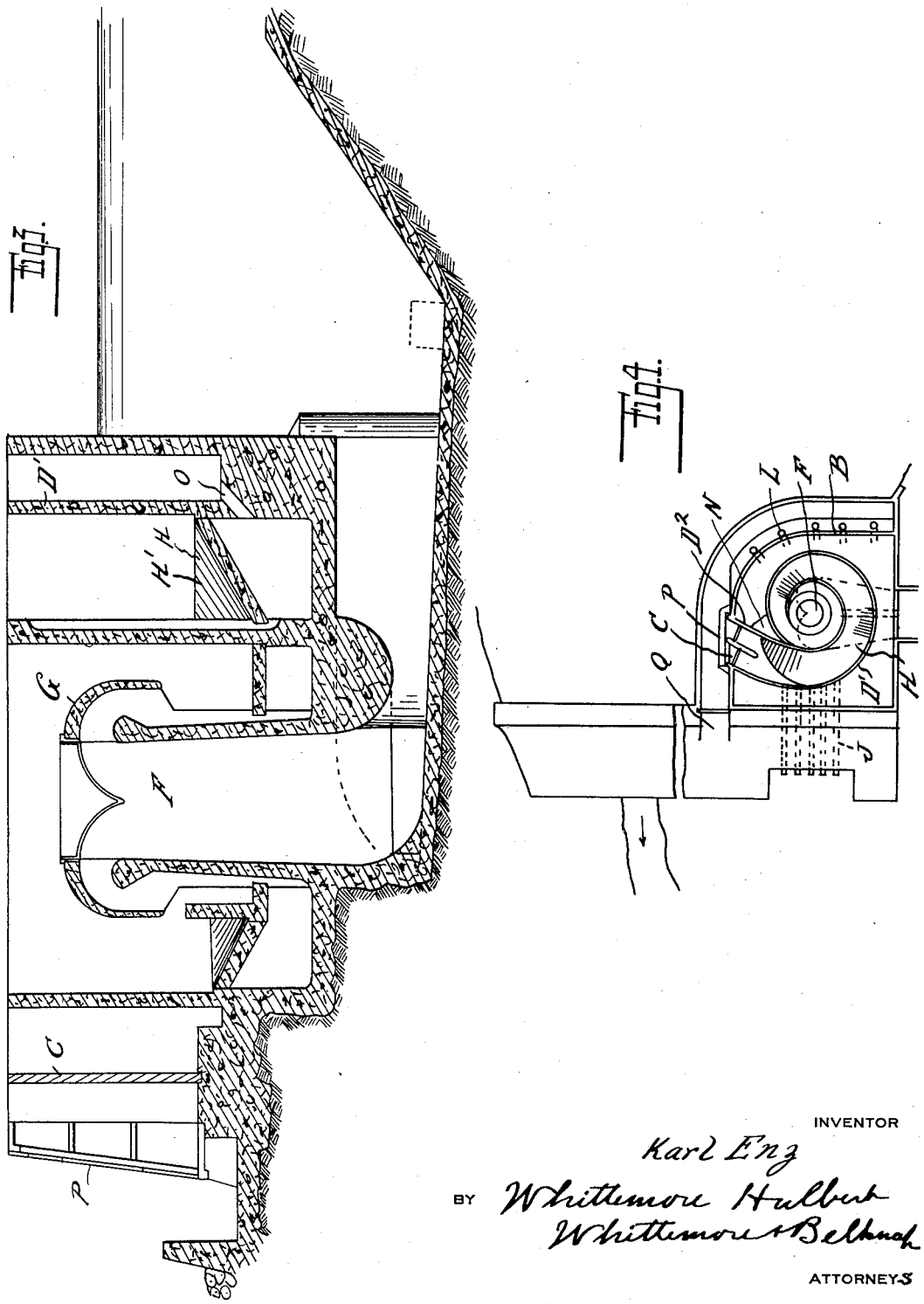
INVENTOR
Karl Enz
BY Whittemore Hulbert
Whittemore & Belknap
ATTORNEYS

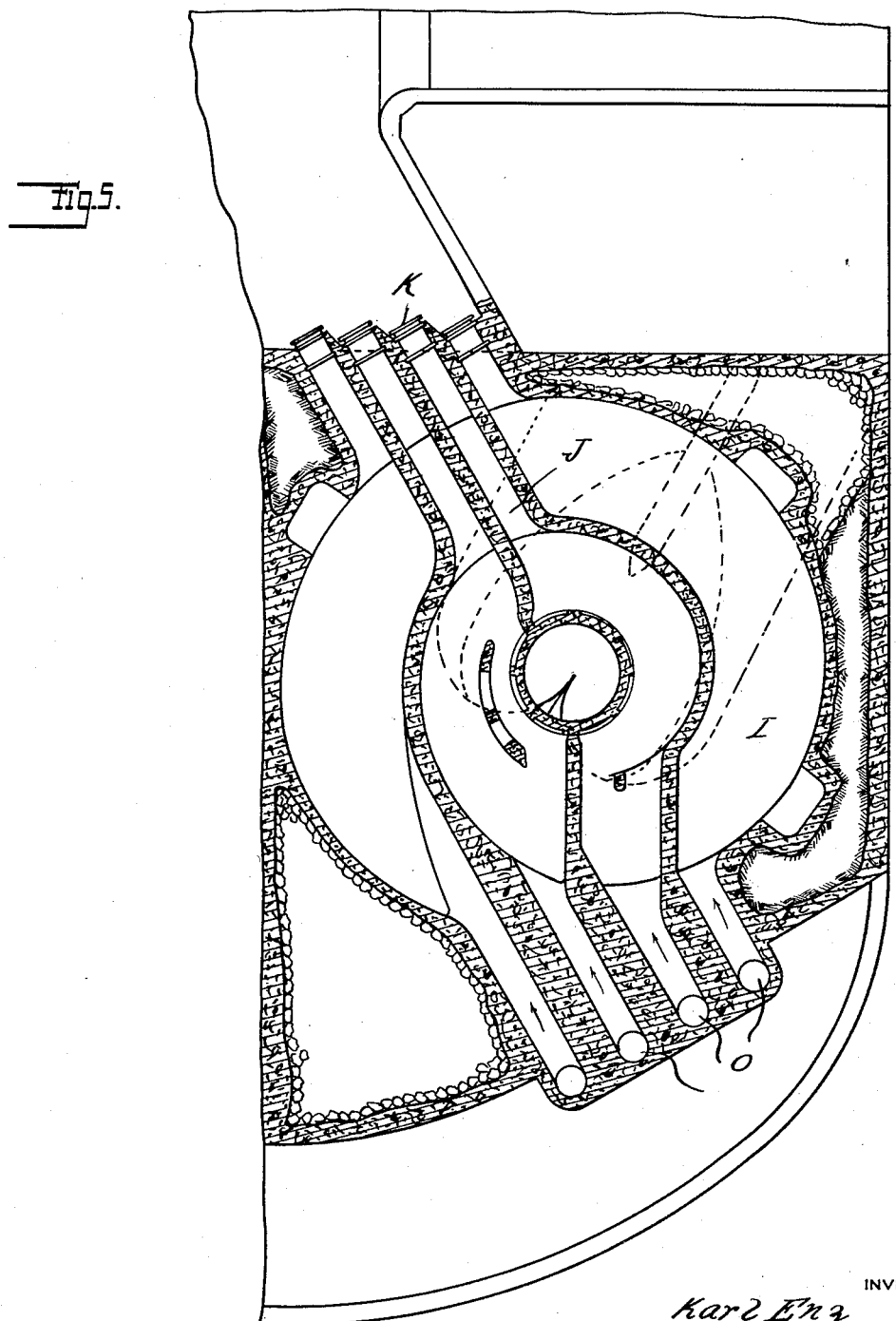

Patented May 29, 1934

1,960,485

UNITED STATES PATENT OFFICE 1,960,485

METHOD AND APPARATUS FOR SEPARATING SAND FROM WATER

Karl Enz, Tokyo-Shigai, Japan, assignor of one-half to William W. Tefft, Jackson, Mich.

Application February 16, 1931, Serial No. 516,194

7 Claims. (Cl. 210—51)

The invention relates to the separation of sand from water which is to be used in hydraulic power plants or any water supply and it is the object of the invention to obtain an effective separation and at the same time to reduce the cost of the construction and the extent of area required for its installation. It is usual with hydraulic power plants or water supplies such as for cities and industries which receive water from flowing streams carrying more or less sand and sediment, to provide a settling basin in which the water is comparatively quiescent to permit the settling out of suspended particles. Such settling basins occupy a large area and are not very efficient in operation. Furthermore, there are various disadvantages such as the difficulty of removing the sand which must be drained by long conduits back into the river bed and the tendency for the sand and sediment to become caked and in a comparatively short time form an oyster-like growth. This requires the periodic draining and scraping of the basin and thus interferes with the operation of the power plant or water supply.

To overcome the difficulties above referred to I have devised a construction and a method of operation by means of which the sand may be effectively separated from the water in a short time interval and in comparatively small space. My invention therefore consists in the method and apparatus as hereinafter set forth.

In the drawings:

Figure 3 is a cross section taken on the staggered line 3, 3$^a$, 3$^b$, 3$^c$, 3$^d$ of Figure 2;

Figure 4 is a plan view showing the apparatus in relation to the dam;

Figure 5 is a horizontal section illustrating the means for flushing out the accumulated sand;

Figure 6 is a detail of a portion of the wall of the outlet conduit F.

The principle of the operation of my improved separator may be illustrated by what occurs in the rotation of sand or sediment carrying water in a circular receptacle. It will be found that after a short time the sand and sediment will collect at the center of the bottom of the receptacle. This is caused first by the rotation and angular velocity of the water and suspended particles in the upper portion of the receptacle which by centrifugal action move radially outward producing a vortex or depression at the center; second, by the radially inward flow adjacent to the bottom of the receptacle, the rotational velocity of which has been frictionally checked and which by reason of the greater head at the periphery flows toward the center. It is this inward current which carries with it the sand and sediment tending to deposit it at the center of the receptacle whereas under centrifugal action it would tend to move outward. The water thus passing radially inward will rise again in the center of the receptacle but unless the rotational velocity is high it will not have power to carry the heavier particles upward. Such particles as do move upward will again be thrown out centrifugally and will return to the center of the bottom.

Making use of the principle above described, I have designed an apparatus in which the sediment carrying water is revolved to carry the sediment to the bottom and towards the center, and I have combined with this construction means for removing the sediment thus deposited so that it can not be again commingled with the water. Finally I have provided an outlet at the center and near the top of the basin where the water is more free from suspended impurities. To render the apparatus still more effective, it is constructed in a spiral form with a peripheral inlet and a bottom which inclines downward in a radially inward direction.

Figure 1:
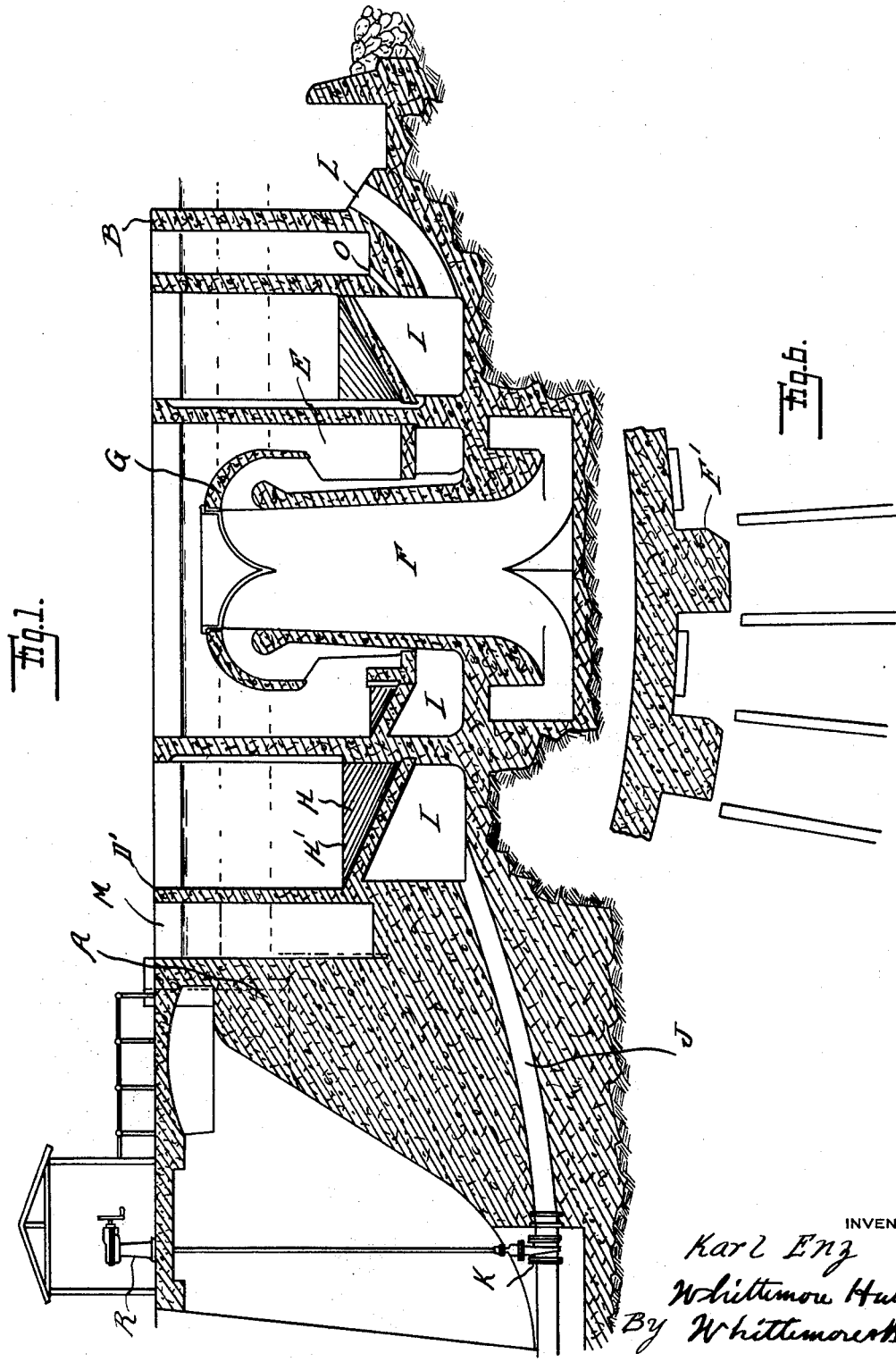
Figure 1 is a longitudinal section through a portion of the dam and the improved sand separating apparatus arranged adjacent thereto.
Figure 2:
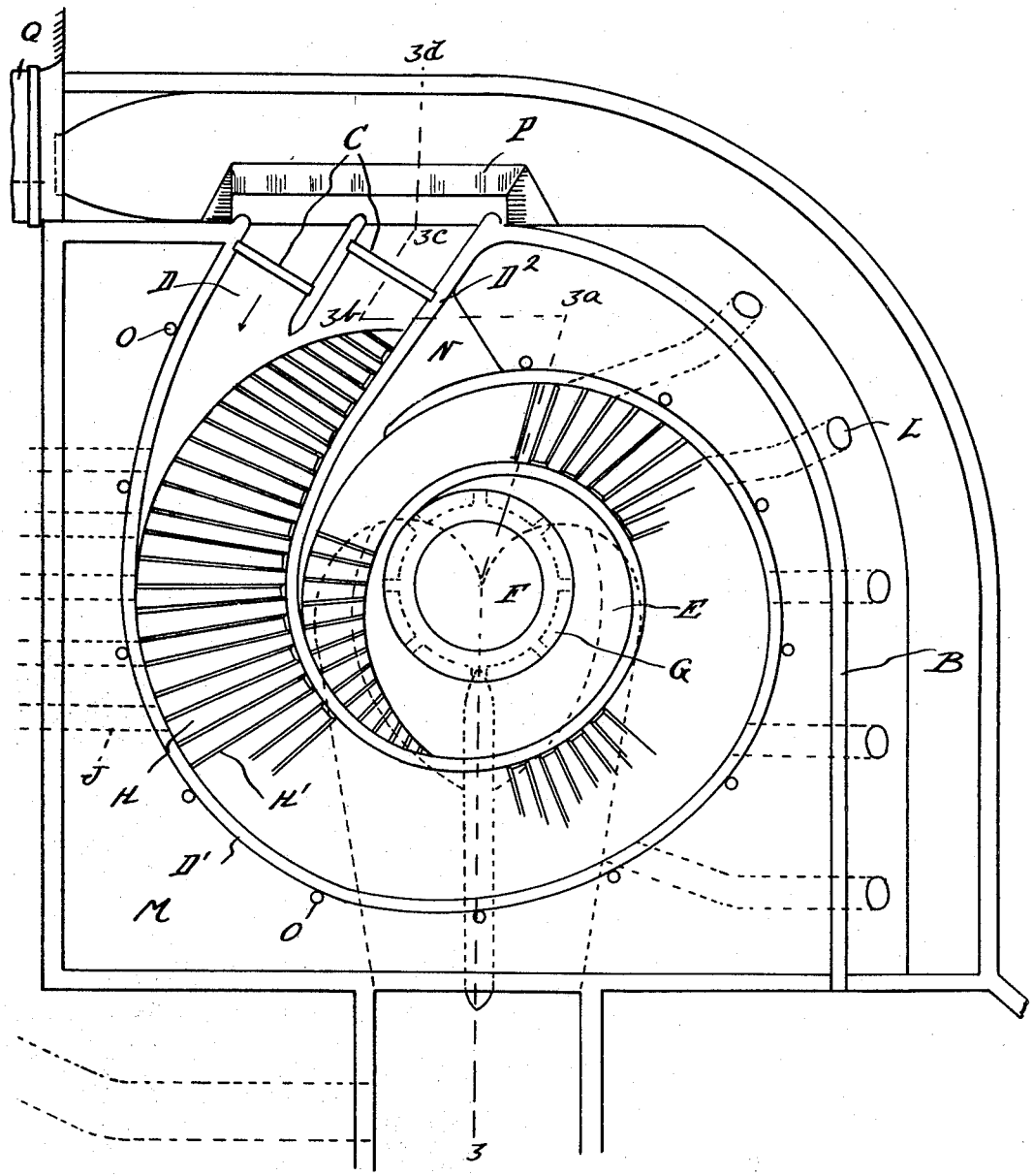
Figure 2 is a plan view.

In addition to the broad features just described there are a number of other specific features which increase the effectiveness of the apparatus such as the means for removal of the accumulated sand and sediment. Such features will, however, be better understood after a specific description of the structure which is as follows:

As shown in Figure 1, A is a section of a dam adjacent to which upon the up-stream side my improved separating apparatus is located. As shown in Figures 2 and 4, this apparatus is located in the corner formed by one end of the dam and the side of the channel, but the location may be varied without changing the operation. B is a wall which separates the apparatus from the basin and which at one point is provided with gates C for the admission of water. These gates direct the stream into a channel D formed by the spiral walls D' and D$^2$ which terminate in a central chamber E. F is an outlet conduit rising in the center of the chamber E to a height less than that of the water in said chamber and the channel D. G is a dome shaped cap or cover for the conduit F which permits the water to enter from below the surface but excludes any floating object.

The bottom of the spiral channel D is formed by a grating or radially slotted and preferably inwardly downwardly extending partition H. This partition separates the channel from a sand receiving chamber I arranged therebeneath and which is provided with outlet conduits J controlled by sand gates K. There is also preferably provided a series of inlets L from outside the wall B which when the sand gates K are open will flush out the sand chamber I.

To assist in conveying the sand collecting upon the partition or inclined bottom wall H into the chamber I beneath the same, I preferably provide means for establishing a downwardly flowing current from the channel D through the slots H'. This is automatically accomplished by surrounding the spiral wall D' with a still chamber M which however, at one point N is connected with the channel D. This connection is arranged to form in effect an ejector which draws water from the still chamber M into the rotating stream in the channel D. The still chamber M is connected by a series of distributed openings O with the sand chamber I and the arrangement is such that the withdrawal of water from the chamber M through the ejector N will cause a down flow of current through the slots H' and apertures I to replace the water thus removed. Consequently the sand which is travelling over the slotted bottom H will be carried by the current through the slots and dropped to the bottom of the chamber I.

From the description above it will be understood that water which is admitted when the gates C are open will travel with increasing linear and angular velocity until it reaches the chamber E at which point its rotational velocity is checked by ribs F" on the outer face of the outlet conduit F. The bottom partition H and the slots H' therein will also tend to check the velocity of the current adjacent thereto so as to permit the radial current to carry the sand inward. This is assisted by the downward inclination of the bottom H while the flow of current through the slots H' will carry the sand into the chamber I. Whenever necessary, the sand may be quickly removed from the chamber I by successively opening the gates K, this being preferably done in flood time when water is abundant. Also by operating the gates K successively instead of simultaneously, the operation of the separator is not interfered with. As shown in Figure 5, the sand chamber I is divided into a number of compartments which are individually connected with the channels J and gates K and openings O, so that each of these compartments can be flushed independently of the others.

The apparatus may be provided with various accessory devices such as a screen P for protecting the inlet conduits and ice discharge Q. The gates K can be opened from the top of the dam or other convenient location as indicated at R.

While the connection of the sand chamber with the still water chamber and the ejection of water from the latter into the spiral stream facilitates the deposit of sand in the sand chamber, this is not essential to the operation of the separator. Thus without such auxiliary devices the sand will still be deposited in the chamber from which it may be periodically removed as previously described.

What I claim as my invention is:

1. An apparatus for separating sand from water comprising a channel through which the sand laden water flows having an apertured bottom, a sand chamber beneath said apertured bottom, a still water chamber adjacent to said channel and communicating with said sand chamber, and a connection between said still water chamber and said channel for withdrawing water from the former to cause sand carrying currents through said apertures.

2. An apparatus for separating sand from water comprising a spiral channel having a peripheral inlet and a central outlet communicating with the upper portion of said spiral channel, an apertured bottom for said spiral channel, a sand chamber beneath said bottom, a still water chamber communicating with said sand chamber and a connection between said still water chamber and an inner portion of said spiral channel adapted to withdraw water from said still water and sand chambers to cause sand laden currents through the apertures in said bottom.

3. An apparatus for separating sand from water comprising a spiral channel having a peripheral inlet and an outlet communicating with the upper portion of said channel centrally of the spiral, a bottom for said channel inclined downward in a radially inward direction and having a series of apertures therethrough, a sand chamber beneath said apertured bottom, a still water chamber communicating with said sand chamber and a connection between said still water chamber and an inner portion of said spiral chamber to eject water from the former and to cause sand laden currents through said apertures.

4. An apparatus for separating sand from water comprising a spiral channel of a progressively decreasing cross section having a peripheral inlet, and an outlet communicating with the upper portion of said channel centrally of said spiral, an apertured bottom for said spiral channel, a sand chamber beneath said apertured bottom, a still water chamber communicating with said sand chamber and a connection between said still water chamber and a high velocity portion of said spiral channel to eject water from the former and to cause sand laden currents through the apertures in said bottom.

5. An apparatus for separating sand from water comprising a spiral channel having a peripheral inlet and an outlet communicating with the upper portion of said channel centrally of the spiral, a bottom for said channel inclining downward in a radially inward direction and provided with a series of transverse slits therethrough, a sand chamber beneath said bottom, a still water chamber adjacent to said spiral channel and communicating with said sand chamber, and a connection between said still water chamber and an inner portion of said spiral channel for withdrawing water from the former to cause sand laden currents through the slits in said bottom.

6. The combination with a dam, of a sand separating apparatus adjacent thereto comprising a spiral channel having a peripheral inlet and a siphonic outlet at the center thereof, a transversely slitted bottom for said channel inclining downward in a radially inward direction, a sand chamber beneath said slitted bottom divided into a plurality of compartments respectively connecting with a discharge channel and an inlet from the head water, valves for normally closing said outlets, a still water chamber communicating with said sand chambers and a connection between said still water chamber and an inner portion of said spiral channel for the purpose described.

7. An apparatus for separating sand from water comprising a spiral channel having a large volume peripheral inlet and a downwardly and inwardly inclined transversely slotted bottom an outlet communicating centrally with the upper portion of said channel and a sand receiving chamber beneath said inclined transversely slotted bottom.

KARL ENZ.